United States Patent
Kobayashi (10) Patent No.: US 8,681,269 B2
(45) Date of Patent: Mar. 25, 2014

(54) VIDEO REPRODUCTION APPARATUS AND VIDEO REPRODUCING METHOD

(75) Inventor: Makoto Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 102 days.

(21) Appl. No.: 12/829,224

(22) Filed: Jul. 1, 2010

(65) Prior Publication Data

US 2011/0007208 A1 Jan. 13, 2011

(30) Foreign Application Priority Data

Jul. 7, 2009 (JP) .................................. 2009-161011

(51) Int. Cl.
*H04N 7/01* (2006.01)
(52) U.S. Cl.
USPC ............ 348/441; 348/448; 348/458; 348/459
(58) Field of Classification Search
USPC .................. 386/219, 230, 232, 343–357; 375/240.02; 348/441, 443, 448, 458, 348/459
See application file for complete search history.

(56) References Cited

U.S. PATENT DOCUMENTS

| | | | | |
|---|---|---|---|---|
| 2005/0083435 A1* | 4/2005 | Itoh et al. | ....................... | 348/441 |
| 2005/0271361 A1* | 12/2005 | Aoki et al. | ....................... | 386/68 |
| 2006/0114334 A1* | 6/2006 | Watanabe et al. | .......... | 348/222.1 |
| 2007/0002167 A1* | 1/2007 | Hsu | ................................ | 348/441 |
| 2008/0284768 A1* | 11/2008 | Yoshida et al. | ................ | 345/208 |
| 2009/0009455 A1* | 1/2009 | Kimura | ........................... | 345/89 |
| 2010/0033630 A1* | 2/2010 | Liang et al. | .................... | 348/558 |
| 2010/0079669 A1* | 4/2010 | Hattori et al. | ................. | 348/500 |

FOREIGN PATENT DOCUMENTS

| | | | |
|---|---|---|---|
| JP | H08-098142 | A | 4/1996 |
| JP | 10-093920 | A | 4/1998 |
| JP | 2002-132224 | A | 5/2002 |
| JP | 2006-003871 | A | 1/2006 |
| JP | 2007-316293 | A | 12/2007 |
| JP | 2008-287042 | A | 11/2008 |

* cited by examiner

*Primary Examiner* — Jefferey Harold
*Assistant Examiner* — Humam Satti
(74) *Attorney, Agent, or Firm* — Canon U.S.A., Inc. IP Division

(57) ABSTRACT

A video reproduction apparatus according to the present invention includes a decoding unit configured to decode a plurality of frames constituting compressed and encoded video information, a display control unit configured to display the plurality of frames decoded by the decoding unit on a display unit, an interpolation unit configured to generate an interpolation frame from the plurality of frames constituting the video information, and a selection unit configured to select the frame to be decoded by the decoding unit based on a reproduction speed of the video information and a driving speed of the display unit, wherein the display control unit displays the frame selected by the selection unit and the interpolation frame generated by the interpolation unit on the display unit.

8 Claims, 7 Drawing Sheets

FIG.3A
NORMAL REPRODUCTION (N=1)

| | | | | | | | | | | |
|---|---|---|---|---|---|---|---|---|---|---|
| 1 | 2 | 3 | 4 | 5 | | 1 | 2 | 3 | 4 | 5 | NORMAL DRIVING (M=1) |
| 1 | 2 | 3 | 4 | 5 | | 1 | 2 | 3 | 4 | 5 | TWO-FOLD-SPEED DRIVING (M=2) |
| 1 | 2 | 3 | 4 | 5 | | 1 | 2 | 3 | 4 | 5 | THREE-FOLD-SPEED DRIVING (M=3) |
| 1 | 2 | 3 | 4 | 5 | | 1 | 2 | 3 | 4 | 5 | FOUR-FOLD-SPEED DRIVING (M=4) |

FIG.3B
TWO-FOLD-SPEED REPRODUCTION (N=2)

| | | | | | | | | | | |
|---|---|---|---|---|---|---|---|---|---|---|
| 1 | 3 | 5 | 7 | 9 | | 1 | 3 | 5 | 7 | 9 | NORMAL DRIVING (M=1) |
| 1 | 2 | 3 | 4 | 5 | 6 | 7 | 8 | 9 | | 1 | 2 | 3 | 4 | 5 | 6 | 7 | 8 | 9 | 10 | TWO-FOLD-SPEED DRIVING (M=2) |
| 1 | (2) | 3 | (4) | 5 | (6) | 7 | (8) | 9 | | 1 | 3 | 5 | 7 | 9 | THREE-FOLD-SPEED DRIVING (M=3) |
| 1 | 2 | 3 | 4 | 5 | 6 | 7 | 8 | 9 | | 1 | 2 | 3 | 4 | 5 | 6 | 7 | 8 | 9 | 10 | FOUR-FOLD-SPEED DRIVING (M=4) |

FIG.3C

THREE-FOLD-SPEED REPRODUCTION (N=3)

FIG.3D

FOUR-FOLD-SPEED REPRODUCTION (N=4)

FIG.6A DISPLAY UNIT IS DRIVEN AT NORMAL SPEED

FIG.6B DISPLAY UNIT IS DRIVEN AT THREE-FOLD SPEED

FIG.6C DISPLAY UNIT IS DRIVEN AT TWO-FOLD SPEED

VIDEO REPRODUCTION APPARATUS AND VIDEO REPRODUCING METHOD

BACKGROUND OF THE INVENTION

1. Field of the Invention

The present invention relates to a video reproduction apparatus including a multiplied speed driving function and a special reproduction function of a display unit, a video reproducing method, a program, and a recording medium thereof.

2. Description of the Related Art

Conventionally in a video reproduction apparatus such as a cathode-ray tube (CRT) type television, an impulse type display system which repeats flashing of light has been used. Therefore, a phenomenon hardly occurs, in which a preceding video remains as an image lag in a video that moves fast and the video looks blurred. In a video reproduction apparatus using a liquid crystal or the like, however, a backlight always lights, and a holding type display system is used. Therefore, a video looks blurred because a preceding video remains as an image lag.

In order to solve this problem, a video of 60 frames per second, for example, is converted into a video of 120 frames per second by inserting an interpolation frame which is generated from a preceding frame or from preceding and succeeding frames between the frames. Further, a video reproduction apparatus using a technique of two-fold speed driving for driving a display unit using a liquid crystal or the like at a speed that is twice a conventional speed to reduce a holding period of time by half and reduce an image lag feeling is in widespread use.

In Japanese Patent Application Laid-Open No. 2002-132224, for example, a liquid crystal display apparatus including a system for dividing one frame into two fields, displaying correction data in the first field and displaying data without any correction in the second field is discussed. On the other hand, a video reproduction apparatus using three-fold speed driving for further increasing a driving speed to reproduce 180 frames per second has also been known.

In a video reproduction apparatus, various special reproduction modes such as high-speed reproduction, skipped reproduction, and frame feeding reproduction have been executed for enabling a user to search for a scene to be viewed in a content. In an image reproduction apparatus described in Japanese Patent Application Laid-Open No. 8-98142, for example, a system for reproducing a content compressed and encoded in a Moving Picture Experts Group (MPEG) system at high speed is discussed. In an embodiment discussed in Japanese Patent Application Laid-Open No. 8-98142, processing for decoding a Bi-directionally predictive coded picture (B picture) is omitted to realize high-speed reproduction of the content.

As described above, the conventional video reproduction apparatus has the function of two-fold speed driving or three-fold speed driving of a display unit and a special reproduction function such as a high-speed reproduction function. In order to implement the functions in combination, frames are generated in the following procedure.

Figure 6A:
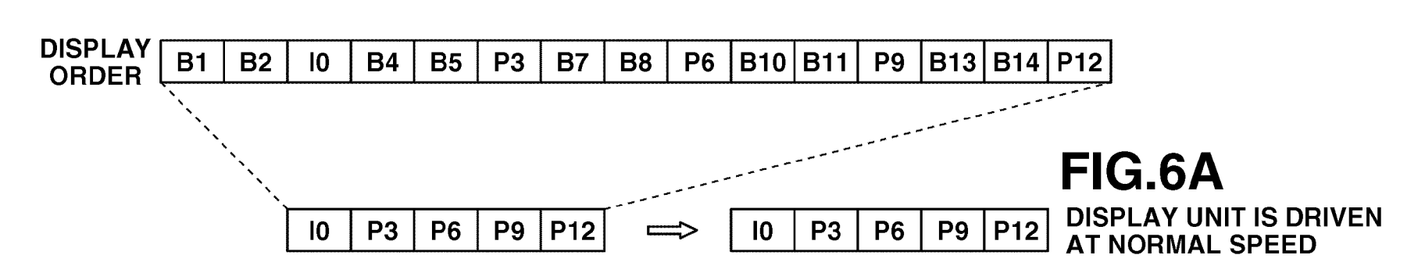
FIGS. 6A to 6C illustrate an outline of processing at the time of three-fold speed reproduction in the conventional video reproduction apparatus.
Figure 6B:
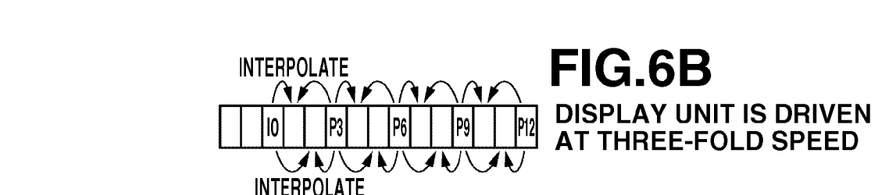
Figure 6C:
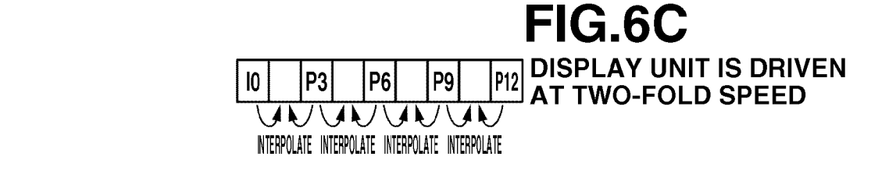

FIGS. 6A to 6C illustrates an outline of processing for frames at the time of three-fold speed reproduction in a conventional video reproduction apparatus. For compressed and encoded content data, frames B1, B2, I0, B4, B5, P3, B7, B8, P6, B10, B11, P9, B13, B14, and P12 are displayed in this order on a display unit 104 by way of example.

At the time of three-fold speed reproduction, a decoder is instructed to thin two frames out of every three frames and decode one frame. Therefore, the decoder decodes the frames I0, P3, P6, P9, and P12 in this order, as illustrated in FIGS. 6A to 6C.

When the display unit 104 is driven at a normal speed as illustrated in FIG. 6A, in other words, the display unit 104 is driven at the same driving speed to a frame rate of the input content, only a frame decoded by the decoder is displayed on the display unit 104. On the other hand, when the display unit 104 is driven at a two-fold driving speed as illustrated in FIG. 6C or a three-fold driving speed as illustrated in FIG. 6B, an interpolation frame to be inserted between the frames is generated from frame data for three-fold speed reproduction decoded by the decoder. Therefore, the frames for three-fold speed reproduction decoded by the decoder and the interpolation frames generated based on the frame data are displayed on the display unit.

However, an interpolation frame that is less needed may be generated according to a driving speed and a reproduction speed of the display unit.

In the example illustrated in FIG. 6B, for example, when the display unit 104 is driven at the three-fold driving speed, two interpolation frames are generated between the frame I0 and the frame P3. In original content data, however, the frame B4 and the frame B5 are not used as frames to be displayed at the time of three-fold speed reproduction, although they exist between the frame I0 and the frame P3. Therefore, interpolation frames are newly generated, although there are usable frames in an original image of the content, so that a processing load may be increased.

When the display unit is driven at a two-fold driving speed as illustrated in FIG. 6C, one interpolation frame is generated between the frame I0 and the frame P3. Conventionally, the interpolation frame is generated from the frame I0 and the frame P3 decoded for three-fold speed reproduction. However, in the original content data, the frame B4 and the frame B5 exist between the frame I0 and the frame P3. Therefore, an interpolation frame which can more accurately reproduce the original image on a time basis can be generated when it is generated using the frame B4 and the frame B5 than when it is generated using the frame I0 and the frame P3. Nevertheless, the interpolation frame is generated from the frame I0 and the frame P3 decoded for three-fold speed reproduction and used. Therefore, high-speed and accurate reproduction closer to the original image cannot be implemented.

SUMMARY OF THE INVENTION

The present invention is directed to a technique which can reproduce a frame closer to an original image of a content. The present invention is further directed to a technique which can prevent an interpolation frame that is less needed from being generated.

According to an aspect of the present invention, a video reproduction apparatus includes a decoding unit configured to decode a plurality of frames constituting compressed and encoded video information, a display control unit configured to display the plurality of frames decoded by the decoding unit on a display unit, an interpolation unit configured to generate an interpolation frame from the plurality of frames constituting the video information, and a selection unit configured to select the frame to be decoded by the decoding unit based on a reproduction speed of the video information and a driving speed of the display unit, wherein the display control unit displays the frame selected by the selection unit and the interpolation frame generated by the interpolation unit on the display unit.

According to the present invention, a frame closer to an original image of a content can be reproduced. Further, according to the present invention, an interpolation frame that is less needed can be prevented from being generated.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A first exemplary embodiment of the present invention will be described below with reference to the drawings. A configuration of a conventional video reproduction apparatus will be first described.

Figure 5:
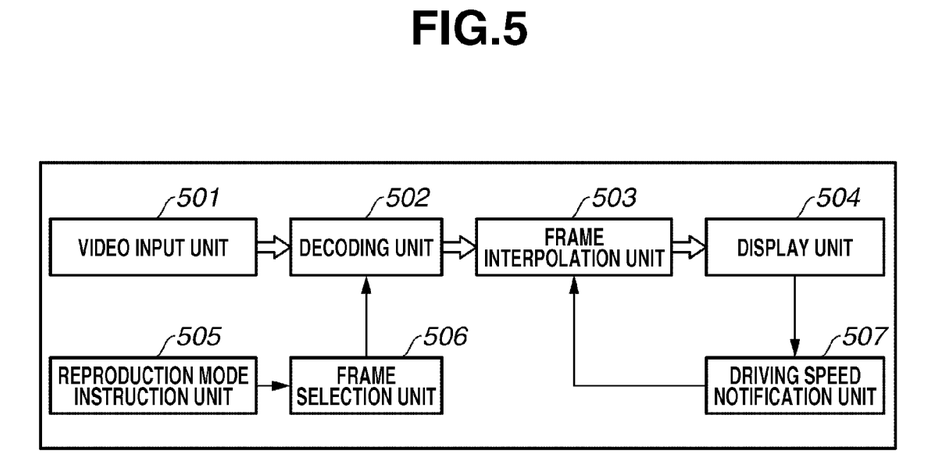
FIG. 5 is a block diagram illustrating an example of a schematic configuration of a conventional video reproduction apparatus.

FIG. 5 is a block diagram illustrating an example of a schematic configuration of a conventional video reproduction apparatus. In FIG. 5, a video input unit 501 receives content data serving as compressed and encoded video information from a recording apparatus or the like connected to the exterior, and a decoding unit 502 decodes the content data. At the time of normal reproduction, a driving speed of a display unit 504 is notified to a frame interpolation unit 503 via a driving speed notification unit 507.

The frame interpolation unit 503 determines whether to generate a frame for interpolating frames from a frame rate of a content and the driving speed of the display unit 504, and generates an interpolation frame based on frame data output from the decoding unit 502.

Instructions for various reproduction modes given by a user from an operation unit (not illustrated) are processed via a reproduction mode instruction unit 505. For example, an instruction for special reproduction such as two-fold speed reproduction is issued to a frame selection unit 506 from the reproduction mode instruction unit 505. The frame selection unit 506 instructs the decoding unit 502 to perform decoding processing by thinning the frames.

The driving speed notification unit 507 may be included in the display unit 504, or may be omitted. When the driving speed notification unit 507 is omitted, the frame interpolation unit 503 is operable by previously recognizing the driving speed of the display unit 504.

In the above described conventional video reproduction apparatus, a frame to be decoded is selected from only a reproduction speed regardless of the driving speed of the display unit 504. In the present exemplary embodiment, a frame used for high-speed reproduction is selected from the driving speed and the reproduction speed of the display unit 504, and is decoded. The video reproduction apparatus according to the present exemplary embodiment will be described below.

Figure 1:
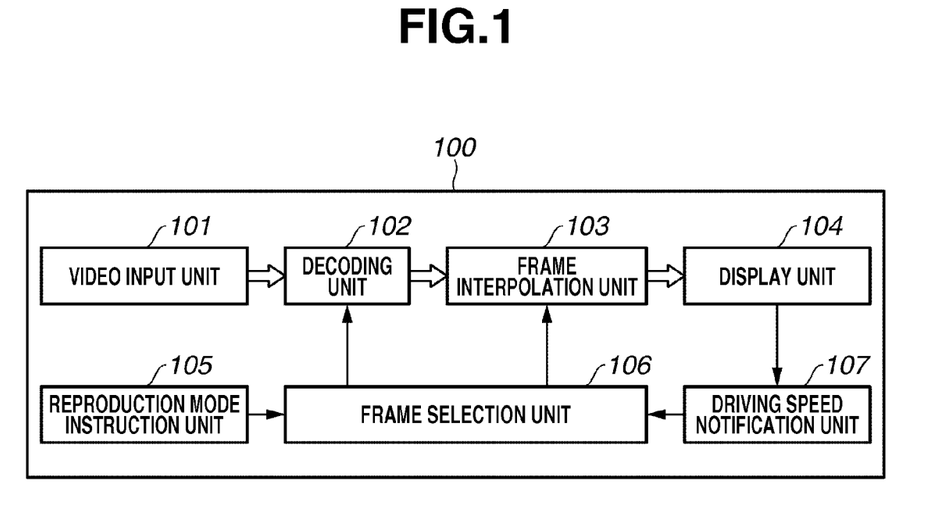
FIG. 1 is a block diagram illustrating an example of a schematic configuration of a video reproduction apparatus according to a first exemplary embodiment.

FIG. 1 is a block diagram illustrating an example of a schematic configuration of a video reproduction apparatus 100 according to the present exemplary embodiment. In FIG. 1, a video input unit 101 acquires compressed and encoded content data from a recording apparatus or the like connected to the exterior, and outputs the acquired content data to a decoding unit 102.

The decoding unit 102 decodes the content data output by the video input unit 101, and outputs a selected frame to a frame interpolation unit 103 according to an instruction from a frame selection unit 106. The decoding unit 102 does not decode all frames included in the content data but decodes a frame to be output to the frame interpolation unit 103 and a reference frame required to decode the frame to be output.

The frame interpolation unit 103 generates an interpolation frame to be inserted, as needed, from frame data in the content output from the decoding unit 102 according to the instruction from the frame selection unit 106. The interpolation frame is generated using a difference between the decoded preceding and succeeding frames. Further, the frame interpolation unit 103 inserts the interpolation frame between the frames in the content output from the decoding unit 102, and outputs the frames to a display unit 104. The display unit 104 performs display control for converting a form of the frames data in the content output from the frame interpolation unit 103 into a form that can be viewed by a viewer.

A reproduction mode instruction unit 105 receives instructions for various reproduction modes from the operation unit (not illustrated) according to a user's operation, and notifies the frame selection unit 106 of the instructions. In special reproduction such as two-fold speed reproduction, for example, information relating to a reproduction speed is notified to the frame selection unit 106.

The frame selection unit 106 receives the information relating to the reproduction speed notified from the reproduction mode instruction unit 105 while receiving information relating to a driving speed of the display unit 104 from a driving speed notification unit 107. Then the frame selection unit 106 selects a frame most suitable to be decoded by the decoding unit 102 and output to the frame interpolation unit 103 from the received information relating to the reproduction speed and the driving speed, and notifies the decoding unit 102 of the selected frame. Further, the frame selection unit 106 instructs the frame interpolation unit 103 to interpolate frames, if necessary.

The driving speed notification unit 107 detects the driving speed of the display unit 104, and notifies the frame selection unit 106 of information relating to the driving speed. If the display unit 104 is a display device that is driven at a two-fold driving speed, for example, the driving speed notification unit 107 notifies the frame selection unit 106 of that the display unit 104 is driven at the two-fold driving speed. The driving speed notification unit 107 may be included in the display unit 104, or may be omitted. If the driving speed notification unit 107 is omitted, the frame selection unit 106 previously recognizes the driving speed of the display unit 104.

Figure 2:
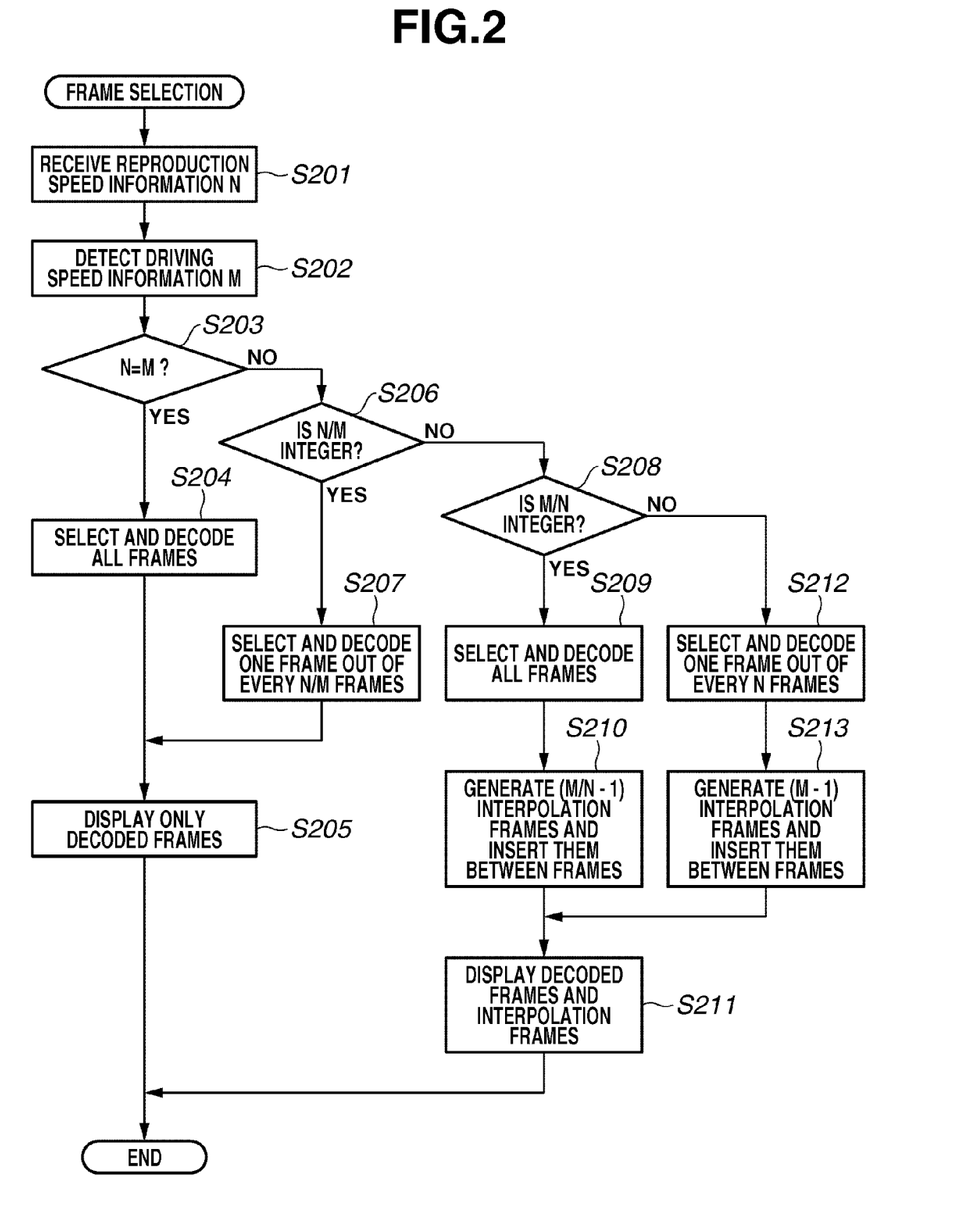
FIG. 2 a flow chart illustrating an example of processing of the video reproduction apparatus according to the first exemplary embodiment.
Figure 3A:
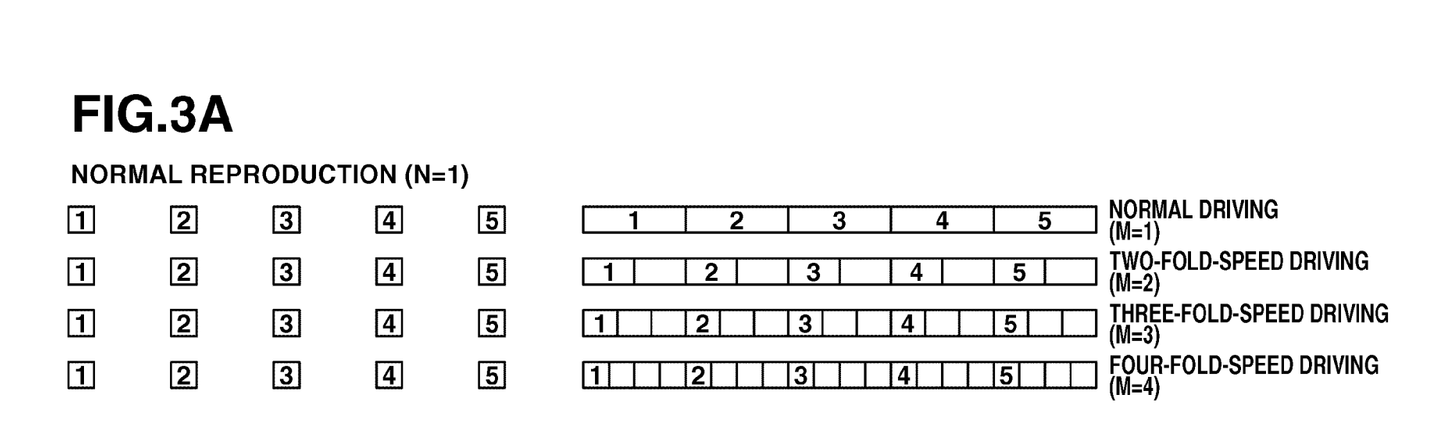
FIGS. 3A to 3D illustrate an example of combinations of frames to be decoded and interpolation frames to be generated.
Figure 3B:
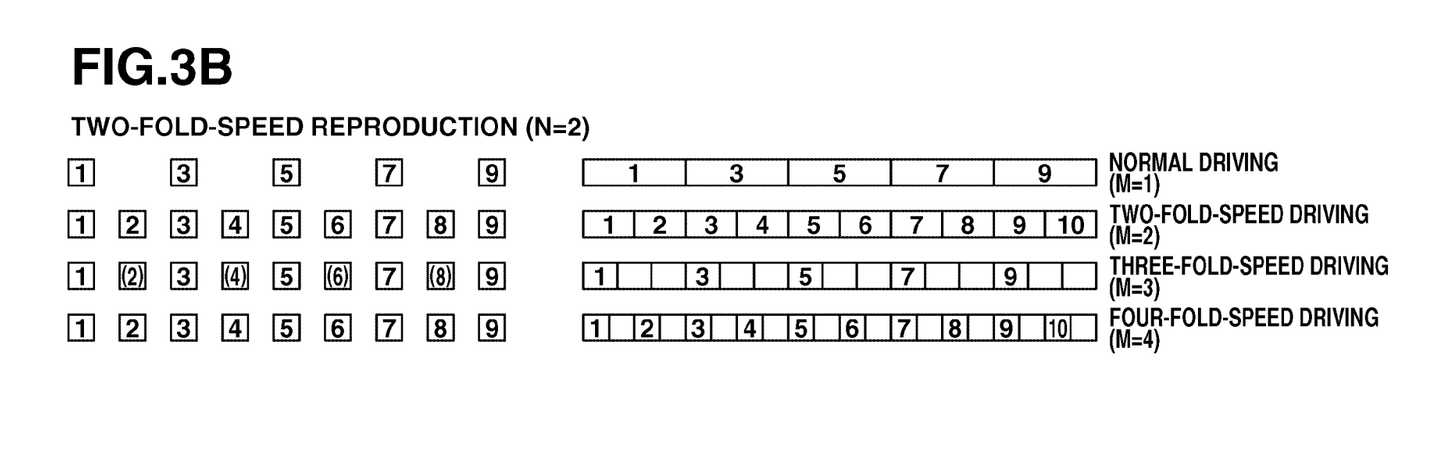
Figure 3C:
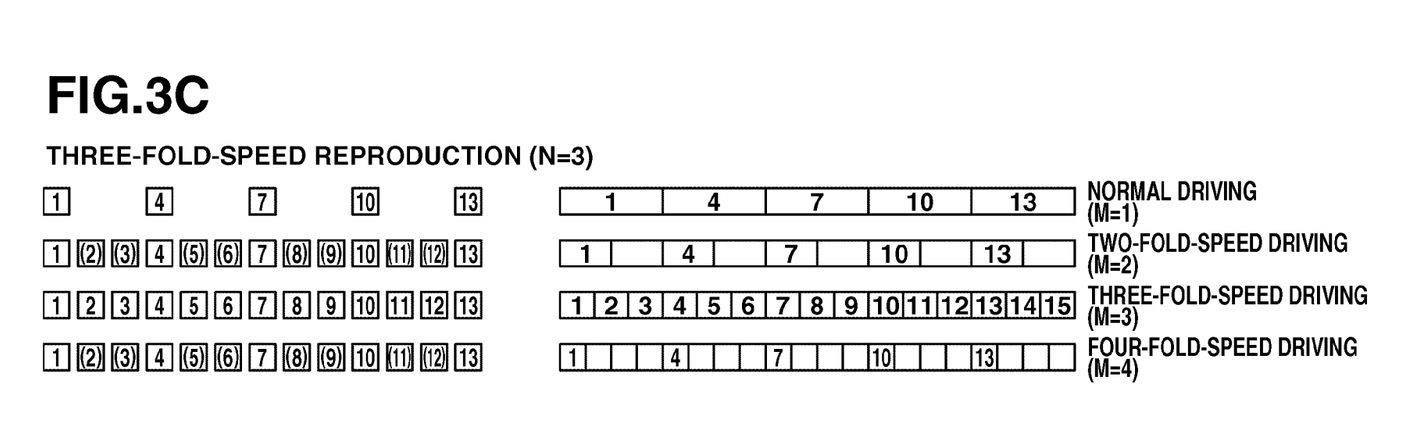
Figure 3D:
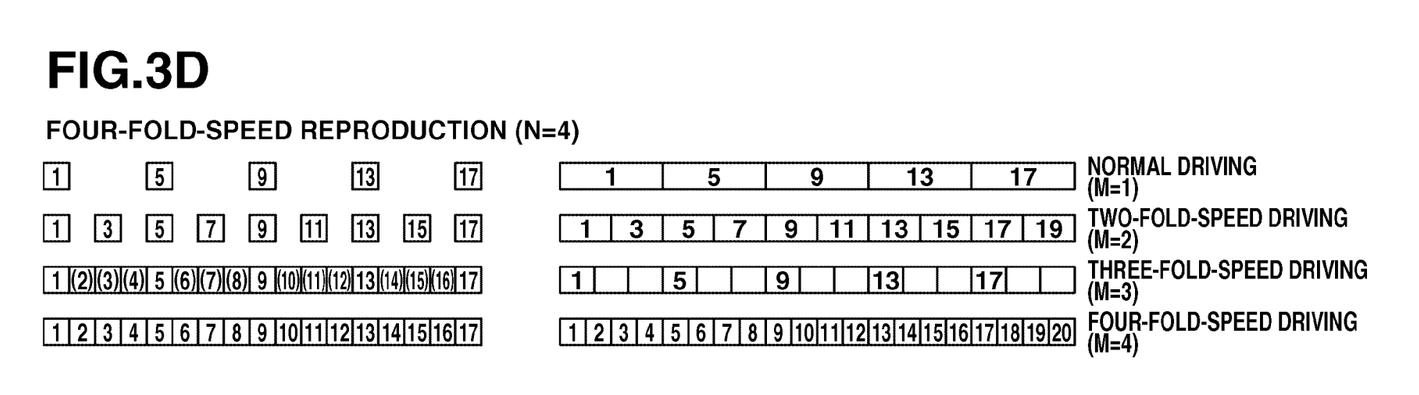

The operations of the video reproduction apparatus 100 according to the present exemplary embodiment will be described below with reference to FIG. 2 and FIGS. 3A to 3D. FIG. 2 is a flow chart illustrating an example of processing in the video reproduction apparatus 100 according to the present exemplary embodiment. FIGS. 3A to 3D illustrate an example of combinations of frames to be decoded and frames to be interpolated which are determined by a combination of the reproduction speed and the driving speed of the display unit 104 in the present exemplary embodiment. FIGS. 3A to 3D illustrate an example of combinations of speeds from a reference driving speed to a four-fold speed of the display unit 104 and speeds from a reference reproduction speed to a four-fold speed by the display unit 104. In the present exemplary embodiment, the reference driving speed is 60 frame per second (fps). In the present exemplary embodiment, a reproduction speed at which a video corresponding to one second is reproduced in one second is the reference reproduction speed.

In FIG. 2, in step S201, the reproduction mode instruction unit 105 first receives an instruction for various reproduction modes, particularly information N relating to a reproduction speed from the operation unit (not illustrated), and notifies the frame selection unit 106 of the information N. For example, in the case of two-fold speed reproduction, the reproduction mode instruction unit 105 notifies the frame selection unit 106 that the reproduction is performed at a speed that is two times higher than in normal reproduction. Similarly, in the case of three-fold speed reproduction, the reproduction mode instruction unit 105 notifies the frame selection unit 106 that the reproduction is performed at a speed that is three times higher than in normal reproduction.

In step S202, the driving speed notification unit 107 then detects information M relating to a driving speed of the display unit 104, and notifies the frame selection unit 106 of the information M. If the driving speed of the display unit 104 is 120 fps, for example, the driving speed notification unit 107 notifies the frame selection unit 106 that the display unit 104 is driven at the two-fold driving speed and if the driving speed of the display unit 104 is 180 fps, and the driving speed notification unit 107 notifies the frame selection unit 106 that the display unit 104 is driven at the three-fold driving speed.

In step S203, the frame selection unit 106 then checks whether N=M. More specifically, the frame selection unit 106 checks whether the information N relating to the reproduction speed and the information M relating to the driving speed of the display unit 104 are equivalent to each other. If N=M as a result of the check (YES in step S203), the processing proceeds to step S204. On the other hand, if N≠M as a result of the check (NO in step S203), the processing proceeds to step S206.

If the display unit 104 is driven at the two-fold driving speed and reproduces a content at the two-fold speed, for example, a numerical value indicated by the information N relating to the reproduction speed is 2, and a numerical value indicated by the information M relating to the driving speed of the display unit 104 is also 2. In this case, it is determined that the information N and the information M are equivalent to each other.

In step S204, the frame selection unit 106 then instructs the decoding unit 102 to decode and output all frames, and the decoding unit 102 decodes all the frames and outputs the decoded frames to the frame interpolation unit 103. In step S205, the frame interpolation unit 103 outputs all the frames output from the decoding unit 102 to the display unit 104, and the display unit 104 reproduces and displays a video at the set driving speed.

As described above, the processing in steps S204 and S205 is thus executed to select and decode all the frames, and all the decoded frames are displayed. In the combinations illustrated in FIGS. 3A to 3D, this case corresponds to when the display unit 104 is driven at the normal driving speed and performs the normal reproduction, when the display unit 104 is driven at the two-fold driving speed and performs the two-fold speed reproduction, when the display unit 104 is driven at the three-fold driving speed and performs the three-fold speed reproduction, and when the display unit 104 is driven at the four-fold driving speed and performs the four-fold speed reproduction.

In this case, the frame selection unit 106 does not instruct the frame interpolation unit 103 to interpolate the frames. Accordingly, the frame interpolation unit 103 does not perform generation of an interpolation frame and insertion of the generated interpolation frame into the frames output from the decoding unit 102. Therefore, the frame interpolation unit 103 directly outputs the frames output from the decoding unit 102 to the display unit 104.

On the other hand, in step S206, the frame selection unit 106 checks whether N/M is an integer other than 1. More specifically, the frame selection unit 106 checks whether the numerical value indicated by the information N relating to the reproduction speed divided by the numerical value indicated by the information M relating to the driving speed of the display unit 104 is an integer. If N/M is an integer other than 1 as a result of the check (YES in step S206), the processing proceeds to step S207. On the other hand, if N/M is not an integer as a result of the check (NO in step S206), the processing proceeds to step S208.

For example, if the display unit 104 is driven at the two-fold driving speed and reproduces the content at the four-fold speed, the numerical value indicated by the information N relating to the reproduction speed is 4, and the numerical value indicated by the information M relating to the driving speed is 2. In the case, it is determined that N/M that is the numerical value indicated by the information N divided by the numerical value indicated by the information M is 2, which is an integer.

In step S207, the frame selection unit 106 then instructs the decoding unit 102 to decode and output one frame out of every N/M frames, and the decoding unit 102 decodes one frame out of every N/M frames and outputs the decoded frame to the frame interpolation unit 103. Then the processing proceeds to step S205. If the display unit 104 is driven at the two-fold driving speed and reproduces the content at the four-fold speed, for example, N/M is 2, and one frame out of every two frames is decoded and output.

As described above, the processing in steps S207 and S205 is thus executed, and one frame out of every N/M frames is selected in the content as a decoding object and all the frames decoded and output are displayed. If the display unit 104 is driven at the two-fold driving speed and performs four-fold speed reproduction, for example, one frame out of every N/M, i.e., two frames is selected as a decoding object, and all the frames decoded and output are displayed. In the combinations illustrated in FIGS. 3A to 3D, this case corresponds to when the display unit 104 is driven at the normal driving speed and performs the two-fold speed reproduction, the three-fold speed reproduction, or the four-fold speed reproduction, and when the display unit 104 is driven at the two-fold driving speed and performs four-fold speed reproduction.

In this case, the frame selection unit 106 does not instruct the frame interpolation unit 103 to interpolate the frames. Accordingly, the frame interpolation unit 103 does not perform generation of an interpolation frame and insertion of the generated interpolation frame into the frames output from the decoding unit 102. Therefore, the frame interpolation unit 103 directly outputs the frames output from the decoding unit 102 to the display unit 104.

On the other hand, in step S208, the frame selection unit 106 checks whether M/N that is a reciprocal of N/M is an integer other than 1. More specifically, the frame selection unit 106 checks whether the numerical value indicated by the information M relating to the driving speed of the display unit 104 divided by the numerical value indicated by the information N relating to the reproduction speed is an integer. If M/N is an integer other than 1 as a result of the check (YES in step S208), the processing proceeds to step S209. On the other hand, if M/N is not an integer as a result of the check (NO in step S208), the processing proceeds to step S212.

For example, if the display unit 104 is driven at the four-fold driving speed and reproduces the content at the two-fold speed, it is considered that the numerical value indicated by the information N relating to the reproduction speed is 2, and the numerical value indicated by the information M relating to the driving speed of the display unit 104 is 4. In the case, it is determined that M/N that is the numerical value indicated by the information M divided by the numerical value indicated by the information N is 2, which is an integer.

In step S209, the frame selection unit 106 then instructs the decoding unit 102 to decode and output all the frames, and the decoding unit 102 decodes all the frames and outputs the decoded frames to the frame interpolation unit 103.

In step S210, the frame selection unit 106 instructs the frame interpolation unit 103 to generate (M/N−1) interpolation frames and insert the generated interpolation frames between the frames decoded by the decoding unit 102. The frame interpolation unit 103 that has received the instruction generates (M/N−1) interpolation frames and inserts the generated interpolation frames between the frames output from the decoding unit 102, and outputs the frames to the display unit 104. For example, when the display unit 104 is driven at the four-fold driving speed and reproduces the content at the two-fold speed, the frame interpolation unit 103 generates (M/N−1), i.e., one interpolation frame and inserts the generated interpolation frame between the frames output from the decoding unit 102, and outputs the frames to the display unit 104.

In step S211, the frame interpolation unit 103 then outputs the frame data output from the decoding unit 102 and the interpolation frame generated and inserted by the frame interpolation unit 103 to the display unit 104, and the display unit 104 reproduces and displays the frames as a video.

As described above, the processing in steps S209 to S211 is thus executed to select and decode all the frames, and generate (M/N−1) interpolation frames. The generated interpolation frames are inserted between the decoded frames, and the frames are displayed. In the combinations illustrated in FIGS. 3A to 3D, this case corresponds to when the display unit 104 is driven at the two-fold driving speed, the three-fold driving speed, or the four-fold driving speed and performs the normal reproduction, and when the display unit 104 is driven at the four-fold driving speed and performs the two-fold reproduction.

On the other hand, in step S212, the frame selection unit 106 instructs the decoding unit 102 to decode and output one frame out of every N frames, and the decoding unit 102 decodes one frame out of every N frames and outputs the decoded frame to the frame interpolation unit 103. For example, if the display unit 104 is driven at the three-fold driving speed and reproduces the content at the two-fold speed, the decoding unit 102 decodes one frame out of every N, i.e., two frames, and outputs the frames to the frame interpolation unit 103.

In step S213, the frame selection unit 106 then instructs the frame interpolation unit 103 to generate (M−1) interpolation frames and insert the generated interpolation frames between the frames decoded by the decoding unit 102. The frame interpolation unit 103 that has received the instruction generates (M−1) interpolation frames and inserts the generated interpolation frames between the frames output from the decoding unit 102, and outputs the frames to the display unit 104. For example, if the display unit 104 is driven at the three-fold driving speed and reproduces the content at the two-fold speed, the frame interpolation unit 103 generates (M−1), i.e., two interpolation frames and inserts the generated interpolation frames between the frames decoded by the decoding unit 102, and outputs the frames to the display unit 104.

The processing in steps S212, S213, and S211 is thus executed, to select one frame out of every N frames. (M−1) interpolation frames are generated and inserted between the frames decoded and output, so that the frames are displayed. In the combinations illustrated in FIGS. 3A to 3D, this case corresponds to when the display unit 104 is driven at the three-fold driving speed and performs the two-fold reproduction or the four-fold reproduction, when the display unit 104 is driven at the two-fold driving speed and performs the three-fold reproduction, and when the display unit 104 is driven at the four-fold driving speed and performs the three-fold reproduction.

As described above, in the video reproduction apparatus 100 according to the present exemplary embodiment, the frame selection unit 106 selects the frame to be decoded by the decoding unit 102 based on the reproduction speed of the content data and the driving speed of the display unit 104. Thus, an interpolation frame is prevented from being newly generated, although there is a usable frame in an original image of the content. As a result, high-speed and accurate reproduction closer to the original image of the content and higher in image quality can be performed.

A second exemplary embodiment of the present invention will be described below with reference to the drawings. A schematic configuration of a video reproduction apparatus according to the present exemplary embodiment is similar to that in the first exemplary embodiment as illustrated in FIG. 1 and hence, the description thereof is not repeated.

Figure 4:
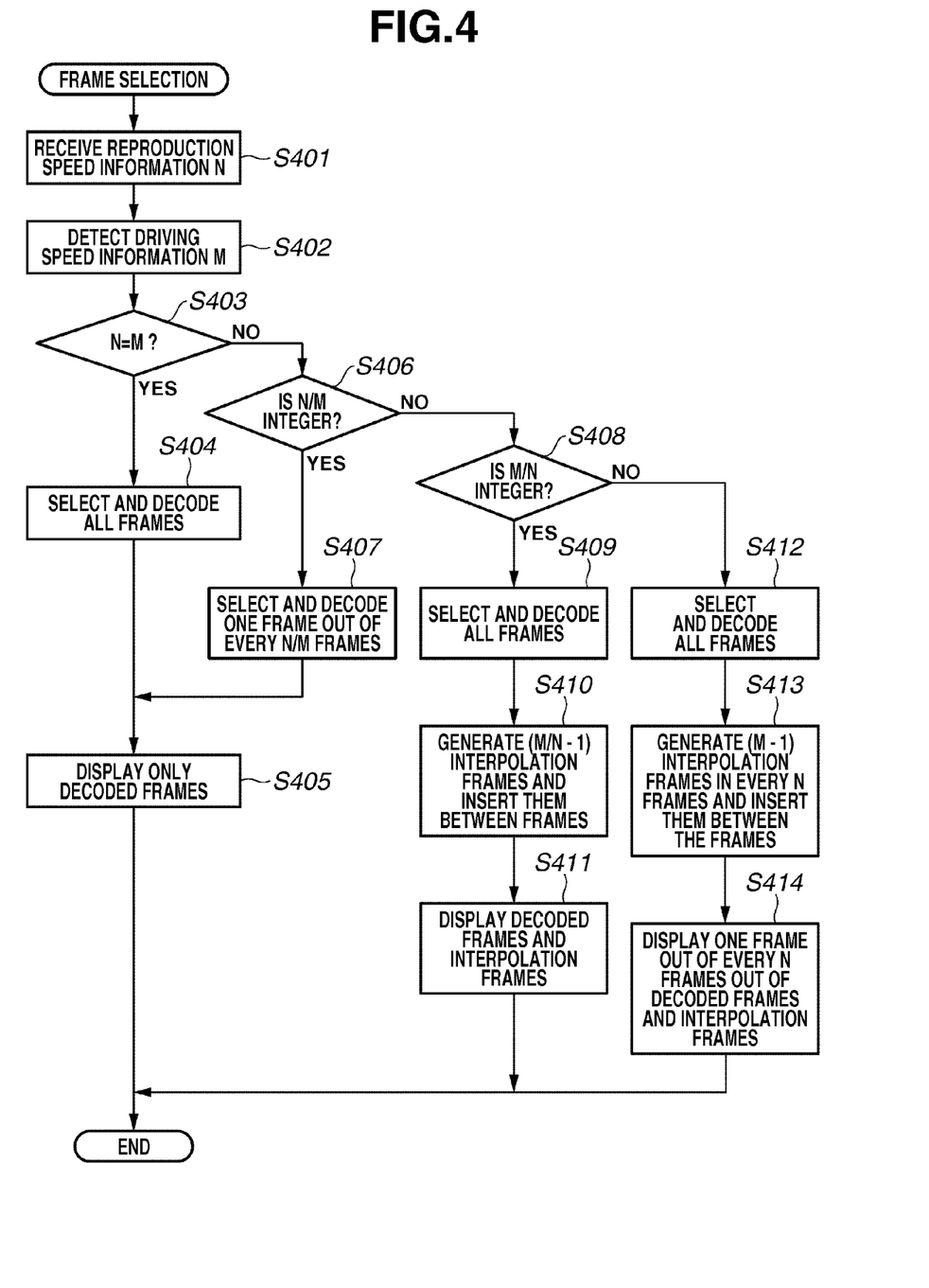
FIG. 4 is a flow chart illustrating an example of processing of a video reproduction apparatus according to a second exemplary embodiment.

The operations of the video reproduction apparatus 100 according to the present exemplary embodiment will be described below with reference to FIGS. 3A to 3D and FIG. 4. FIG. 4 is a flow chart illustrating an example of processing of the video reproduction apparatus 100 according to the present exemplary embodiment. Processing in steps S401 to S411 illustrated in FIG. 4 is similar to the processing in steps S201 to S211 illustrated in FIG. 2 and hence, the description thereof is not repeated.

In step S412, the frame selection unit 106 instructs the decoding unit 102 to decode and output all frames, and the decoding unit 102 decodes all the frames and outputs the decoded frames to the frame interpolation unit 103.

In step S413, the frame selection unit 106 then instructs the frame interpolation unit 103 to generate (M−1) interpolation frames and inserts the generated interpolation frames between every N frames which are decoded and output by the decoding unit 102. The frame interpolation unit 103 that has received the instruction generates (M−1) interpolation frames, inserts the generated interpolation frames between every N frames output from the decoding unit 102, and outputs the frames to the display unit 104.

In step S414, the frame interpolation unit 103 then outputs frames at a ratio of one frame out of every N frames among all the decoded frames and (M−1) interpolation frames between the frames to the display unit 104. The display unit 104 reproduces and displays the frames as a video. The frames included between the N frames decoded and output by the decoding unit 102 are thus only used to generate the (M−1) interpolation frames, and are not output to the display unit 104.

For example, when the display unit 104 is driven at the three-fold driving speed and reproduces a content at the two-fold speed, the frame interpolation unit 103 generates (M−1), i.e., two interpolation frames, inserts the generated interpolation frames between every two of the frames decoded by the decoding unit 102, and outputs the frames to the display unit 104. Thus, the frames output to the display unit 104 include the frames at a ratio of one frame out of every two frames and the two interpolation frames between the frames.

In the example illustrated in FIGS. 3A to 3D, the frame interpolation unit 103 generates two interpolation frames from first, second, and third frames decoded and output by the decoding unit 102 and inserts the generated two interpolation frames between the first and third frames, and outputs the frames to the display unit 104. Therefore, the second frame decoded and output by the decoding unit 102 is only used to generate the two interpolation frames, and is not output to the display unit 104.

As described above, one frame out of every N of the frames decoded by the decoding unit 102 and the interpolation frames generated and inserted by the frame interpolation unit 103 are displayed as a moving image, and the processing is terminated.

The processing in steps S412, S413, and S414 is thus executed, to select and decode all the frames. Further, every N of the decoded frames, (M−1) interpolation frames are newly generated and inserted between the frames, and the frames are displayed. In the combinations illustrated in FIGS. 3A to 3D, this case corresponds to when the display unit 104 is driven at the three-fold driving speed and performs the two-fold speed reproduction or the four-fold speed reproduction, and when the display unit 104 is driven at the two-fold driving speed or the four-fold driving speed and performs the three-fold speed reproduction.

As described above, the video reproduction apparatus 100 according to the present exemplary embodiment can generate an interpolation frame by referring to frames closer thereto on a time basis, so that high-speed and accurate reproduction closer to the original image of the content and higher in image quality can be performed.

Although an interpolation frame is generated using a difference between the preceding and succeeding frames in the first and second exemplary embodiments, an interpolation frame may be generated from only the preceding frame. At this time, the interpolation frame may be generated by prediction from a plurality of preceding frames. Alternatively, an interpolation frame may be not merely generated but also generated by respectively giving different weights to frames to be referred to.

An object of the present invention is realized by the following form. A storage medium which can be read by a system or a computer and stores a program code of software for implementing the functions of the above described exemplary embodiments is supplied to an apparatus such as a system or a computer. A control unit (a central processing unit (CPU), a micro-processing unit (MPU), or one including them) in the apparatus such as the system or the computer reads and executes the program code stored in the recording medium, so that the present invention can be realized.

In this case, the program code itself read out of the recording medium implements the function of the above described exemplary embodiment. The computer-readable recording medium that stores the program code constitutes the present invention.

Examples of the recording medium for supplying the program code include a flexible disk, a hard disk, an optical disk (a compact disk (CD), a digital versatile disk (DVD), or the like), a magneto-optical (MO) disk, a magnetic tape, and a nonvolatile memory card.

The functions of the above described exemplary embodiments are not only implemented by executing the program code read out by the control unit. An operating system (OS) or the like operating on the apparatus such as the system or the computer based on an instruction of the program code performs a part or the whole of actual processing. The functions of the above described exemplary embodiments may be implemented by the processing.

The program code read out of the recording medium is written into a memory included in a function expansion board inserted into the computer or a function expansion unit connected to the computer. Then, the CPU or the like included in the functional expansion board or the function expansion unit performs a part or the whole of actual processing. The functions of the above described exemplary embodiments may be implemented by the processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-161011 filed Jul. 7, 2009, which is hereby incorporated by reference herein in its entirety.

What is claimed is:

1. A video reproduction apparatus comprising:
   a decoding unit configured to decode a plurality of frames constituting compressed and encoded video information;
   a display control unit configured to display the plurality of frames decoded by the decoding unit on a display unit;
   an interpolation unit configured to generate at least one interpolation frame from the plurality of frames constituting the video information; and
   a selection unit configured to select at least one frame from the plurality of frames to be decoded by the decoding unit based on a relation between a ratio of a reproduction speed to a reference reproduction speed of the video information and a ratio of a driving speed to a reference driving speed of the display unit,
   wherein when N/M that is a ratio N of the reproduction speed to a reference reproduction speed divided by a ratio M of the driving speed to a reference driving speed is an integer other than one, the selection unit selects one frame out of every N/M frames in the video information, and the interpolation unit does not generate the at least one interpolation frame,
   wherein when M/N that is a ratio M of the driving speed to a reference driving speed divided by a ratio N of the reproduction speed to a reference reproduction speed is an integer other than one, the selection unit selects all the frames constituting the video information and the interpolation unit generates (M/N−1) interpolation frames between the plurality frames decoded by the decoding unit, wherein when neither N/M that is a ratio N of the reproduction speed to a reference reproduction speed divided by a ratio M of the driving speed to a reference driving speed nor a reciprocal M/N thereof is an integer, the selection unit selects one frame out of every N frames in the video information, and the interpolation unit generates (M−1) interpolation frames between the plurality frames decoded by the decoding unit, wherein the display control unit displays the at least one frame selected by the selection unit and the at least one interpolation frame generated by the interpolation unit on the display unit if the at least one interpolation frame was generated.

2. The video reproduction apparatus according to claim 1, wherein when a ratio N of the reproduction speed to a reference reproduction speed and a ratio M of the driving speed to a reference driving speed are the same, the selection unit selects all the frames constituting the video information, and the interpolation unit does not generate the interpolation frame.

3. A video reproduction apparatus comprising:
a decoding unit configured to decode a plurality of frames constituting compressed and encoded video information;
a display control unit configured to display the plurality of frames decoded by the decoding unit on a display unit;
an interpolation unit configured to generate at least one interpolation frame from the plurality of frames constituting the video information; and
a selection unit configured to select at least one frame to be decoded by the decoding unit based on a relation between a ratio of a reproduction speed to a reference reproduction speed of the video information and a ratio of a driving speed to a reference driving speed of the display unit, wherein when N/M that is a ratio N of the reproduction speed to a reference reproduction speed divided by a ratio M of the driving speed to a reference driving speed is an integer other than one, the selection unit selects one frame out of every N/M frames in the video information, and the interpolation unit does not generate the at least interpolation frame, wherein when M/N that is a ratio M of the driving speed to a reference driving speed divided by a ratio N of the reproduction speed to a reference reproduction speed is an integer other than one, the selection unit selects all the frames constituting the video information and the interpolation unit generates (M/N−1) interpolation frames between the frames decoded by the decoding unit, wherein when neither N/M that is a ratio N of the reproduction speed to a reference reproduction speed divided by a ratio M of the driving speed to a reference driving speed nor a reciprocal M/N thereof is an integer, the selection unit selects all the frames constituting the video information, the interpolation unit generates (M−1) interpolation frames every N frames decoded by the decoding unit, and the display control unit displays the frames at a ratio of one frame out of every N frames decoded by the decoding unit and the interpolation frames generated by the interpolation unit on the display unit, wherein the display control unit displays the at least one frame selected by the selection unit and the at least one interpolation frame generated by the interpolation unit on the display unit if the at least interpolation frame was generated.

4. A method for reproducing a video, the method comprising:
decoding a plurality of frames constituting compressed and encoded video information;
generating at least one interpolation frame from the plurality of frames constituting the video information;
selecting at least one frame to be decoded based on relation between a ratio of a reproduction speed to a reference a reproduction speed of the video information and a ratio of a driving speed to a reference driving speed of the display unit;
selecting, when N/M that is a ratio N of the reproduction speed to a reference reproduction speed divided by a ratio M of the driving speed to a reference driving speed is an integer other than one, one frame out of every N/M frames in the video information; and not generating the at least one interpolation frame;
selecting all the frames constituting the video information when M/N that is a ratio M of the driving speed to a reference driving speed divided by a ratio N of the reproduction speed to a reference reproduction speed is an integer other than one, and generating (M/N−1) interpolation frames between the decoded frames;
selecting, when neither N/M that is a ratio N of the reproduction speed to a reference reproduction speed divided by a ratio M of the driving speed to a reference driving speed nor a reciprocal M/N thereof is an integer, one frame out of every N frames in the video information, and generating (M−1) interpolation frames between the decoded frames; and
displaying the selected at least one frame and the at least one generated interpolation frame on the display unit if the at least one interpolation frame was generated.

5. The method according to claim 4, further comprising:
selecting all the frames constituting the video information when a ratio N of the reproduction speed to a reference reproduction speed and a ratio M of the driving speed to a reference driving speed are the same, and not generating the interpolation frame.

6. decoding a plurality of frames constituting compressed and encoded video information;
generating at least one interpolation frame from the plurality of frames constituting the video information;
selecting at least one frame to be decoded based on relation between a ratio of a reproduction speed to a reference a reproduction speed of the video information and a ratio of a driving speed to a reference driving speed of the display unit;
selecting, when N/M that is a ratio N of the reproduction speed to a reference reproduction speed divided by a ratio M of the driving speed to a reference driving speed is an integer other than one, one frame out of every N/M frames in the video information; and not generating the at least one interpolation frame;
selecting all the frames constituting the video information when M/N that is a ratio M of the driving speed to a reference driving speed divided by a ratio N of the reproduction speed to a reference reproduction speed is an integer other than one, and generating (M/N−1) interpolation frames between the decoded frames;
selecting all the frames constituting the video information when neither N/M that is a ratio N of the reproduction speed to a reference reproduction speed divided by a ratio M of the driving speed to a reference driving speed nor the reciprocal M/N thereof is an integer;

generating (M−1) interpolation frames every N of the decoded frames; and displaying the at least one selected frames at a ratio of one frame out of every N of the decoded frames and the generated the at least one interpolation frames on the display unit if the at least one interpolation frame was generated.

7. A non-transitory computer-readable recording medium having stored thereon a program for performing a method according to claim 4.

8. A non-transitory computer-readable recording medium having stored thereon a program for performing a method according to claim 6.

* * * * *